United States Patent
Ulrich et al.

(10) Patent No.: US 8,706,811 B2
(45) Date of Patent: Apr. 22, 2014

(54) PREVENTING REDIRECTION LOOPS DURING COLLABORATIVE WEB BROWSING

(75) Inventors: Sean M. Ulrich, Morrisville, NC (US); Jennifer G. Zawacki, Hillsborough, NC (US); David C. Challener, Raleigh, NC (US); Julie A. Morris, Raleigh, NC (US); James J. Thrasher, Efland, NC (US); Justin T. Dubs, Durham, NC (US); Peter G. Gaucher, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1349 days.

(21) Appl. No.: 12/242,486

(22) Filed: Sep. 30, 2008

(65) Prior Publication Data
US 2010/0083132 A1   Apr. 1, 2010

(51) Int. Cl.
*G06F 15/163*   (2006.01)

(52) U.S. Cl.
USPC ........... 709/205; 715/751; 715/753; 709/204; 709/226; 709/217

(58) Field of Classification Search
USPC .......................................... 709/205; 715/751
See application file for complete search history.

(56) References Cited

U.S. PATENT DOCUMENTS

| | | | | |
|---|---|---|---|---|
| 6,081,788 A * | 6/2000 | Appleman et al. | ......... | 705/14.46 |
| 6,240,444 B1 * | 5/2001 | Fin et al. | ........................ | 709/205 |
| 7,287,054 B2 * | 10/2007 | Lee et al. | ....................... | 709/204 |
| 7,305,439 B2 * | 12/2007 | Qian et al. | ...................... | 709/205 |
| 2002/0062343 A1 * | 5/2002 | Appleman et al. | ............ | 709/203 |
| 2002/0065877 A1 * | 5/2002 | Kowtko et al. | ................ | 709/203 |
| 2002/0065912 A1 * | 5/2002 | Catchpole et al. | ............. | 709/224 |
| 2002/0138624 A1 * | 9/2002 | Esenther | ........................ | 709/227 |
| 2003/0208535 A1 * | 11/2003 | Appleman et al. | ............ | 709/203 |
| 2005/0015492 A1 * | 1/2005 | Kumbalimutt et al. | ........ | 709/226 |
| 2005/0138435 A1 * | 6/2005 | Kaufman et al. | .............. | 713/202 |
| 2005/0198116 A1 * | 9/2005 | Appleman et al. | ............ | 709/203 |
| 2006/0129642 A1 * | 6/2006 | Qian et al. | ...................... | 709/205 |
| 2007/0106748 A1 * | 5/2007 | Jakobsson et al. | ............ | 709/217 |
| 2010/0082746 A1 * | 4/2010 | Ulrich et al. | ................... | 709/204 |
| 2010/0083135 A1 * | 4/2010 | Zawacki et al. | ................ | 715/753 |

OTHER PUBLICATIONS (R. Fielding, "Hyptertext Transfer Protol—HTTP/1.1", Jun. 1999, The Internet Society, RFC 2616, pg. 40).*
Matihewssoftware.com; <http://www.matthewssoftware.com/BrowserFor2/>, Vancouver, WA 98682, 5 pp, Aug. 10, 2003.*
Mozdev Community Organization, Incorporated, New York Not-for-Profit corporation, <http://www.dertandembrowser.mozdev.org>, 2 pp, Oct. 6, 2003.*
Tucows Inc., Toronto, ON Canada, <http://www.tucows.com/preview/405810/Jybe>, 2 pp, May 4, 2005.*

(Continued)

*Primary Examiner* — William Bashore
*Assistant Examiner* — Reza Nabi
(74) *Attorney, Agent, or Firm* — Ference & Associates LLC

(57) ABSTRACT

A system for preventing redirection loops during collaborative web browsing is provided comprising: a CPU; a memory in communication with the CPU; instructions stored in the memory and executable by the CPU to prevent redirects encountered during a collaborative web browsing session, the instructions further comprising: instructions enabling a device to join a collaborative web browsing session; instructions enabling detection of a redirection loop; and instructions enabling termination of the redirect loop.

16 Claims, 6 Drawing Sheets

(56) References Cited

OTHER PUBLICATIONS

Cambrian House Inc., Calgaray, AB, Canada, <http://www.cambrianhouse.com/idea/idea-promoter/ideas-id/urGzlfm/>, 5 pp, May 11, 2007.*

Nakamura, M.; Ma, J.; Chiba, K.; Shizuka, M.; Miyoshi, Y. Design and implementation of a P2P shared Web browser using JXTA Advanced Information Networking and Applications, 2003. AINA 2003, 17th International Conference on Volume , Issue , Mar. 27-29, 2003 pp. 111-116.

Advanced Reality Inc Jype 2.0. http:www.shared-spaces.com/blog/2005/01/review_of_advan.html Published: May 4, 2005 3 pp.

Matthewssoftware.Com; www.matthewssoftware.com/BrowserFor2/; Vancouver, WA 98682; 5 pp; Aug. 10, 2003.

Mozdev Community Organization, Incorporated, New York Not-for-Profit corporation; www.dertandembrowsermozdev.org; 2 pp, Oct. 6, 2003.

Tucows Inc., Toronto, ON Canada; www.tucows.com/preview/405810/Jybe; 2 pp., May 4, 2005.

Cambrian House Inc.; Calgary Calgaray, AB, Canada; www.cambrianhouse.com/idea/idea-promoter/ideas-id/urGzlfm/; 5 pp., May 11, 2007.

* cited by examiner

PREVENTING REDIRECTION LOOPS DURING COLLABORATIVE WEB BROWSING

FIELD OF THE INVENTION

This invention relates generally to computing systems and in particular to providing systems, methods and arrangements for enabling users of different computing devices to establish and share a web-browsing session with one another while avoiding common problems associated therewith.

BACKGROUND OF THE INVENTION

There is an increasing desire on the part of two or more parties to participate in a collaborative web-browsing session. One common example is a shared online shopping experience. For instance, one person looking at a new product online may wish to ask another (remotely located) person "do you like this"? The first person would normally then follow up (or couple to) the question by a sending a link (i.e. a Uniform Resource Locator (URL)) to the web page containing the picture of the product currently being viewed to the other person. That is, send the second person a link to the currently viewed web page such that upon clicking the link, a web browser would open the page for viewing by the second person. If additional people were involved (e.g. the first person wanted to have the opinions of others as well), a similar process for sharing the link and the related information would be followed, e.g. via pasting a link into instant messenger.

A collaborative web browsing session can used to share a web browsing experience. However, due to the nature of how web browsers operate, a problem of redirection loops is created wherein the users in a collaborative web browsing session may be caught in a cycle of redirection, when particular URLs are encountered, that is not controllable.

Traditional solutions for collaborative web browsing create redirection loops. Therefore, there is a need for a solution that addresses the shortcomings of the conventional arrangements summarized above.

SUMMARY OF THE INVENTION

In summary, one aspect of the invention provides a system comprising: a CPU; a memory in communication with the CPU; instructions stored in the memory and executable by the CPU to prevent redirects encountered during a collaborative web browsing session, the instructions further comprising: instructions enabling a device to join a collaborative web browsing session; instructions enabling detection of a redirection loop; and instructions enabling termination of the redirect loop.

Another aspect of the present invention provides a method comprising: enabling a device to join a collaborative web browsing session; detecting a redirection loop; and terminating the redirect loop.

Another aspect of the present invention provides a program storage device readable by machine, tangibly embodying a program of instructions executable by the machine to perform a method comprising: enabling a device to join a collaborative web browsing session; detecting a redirection loop; and terminating the redirect loop.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
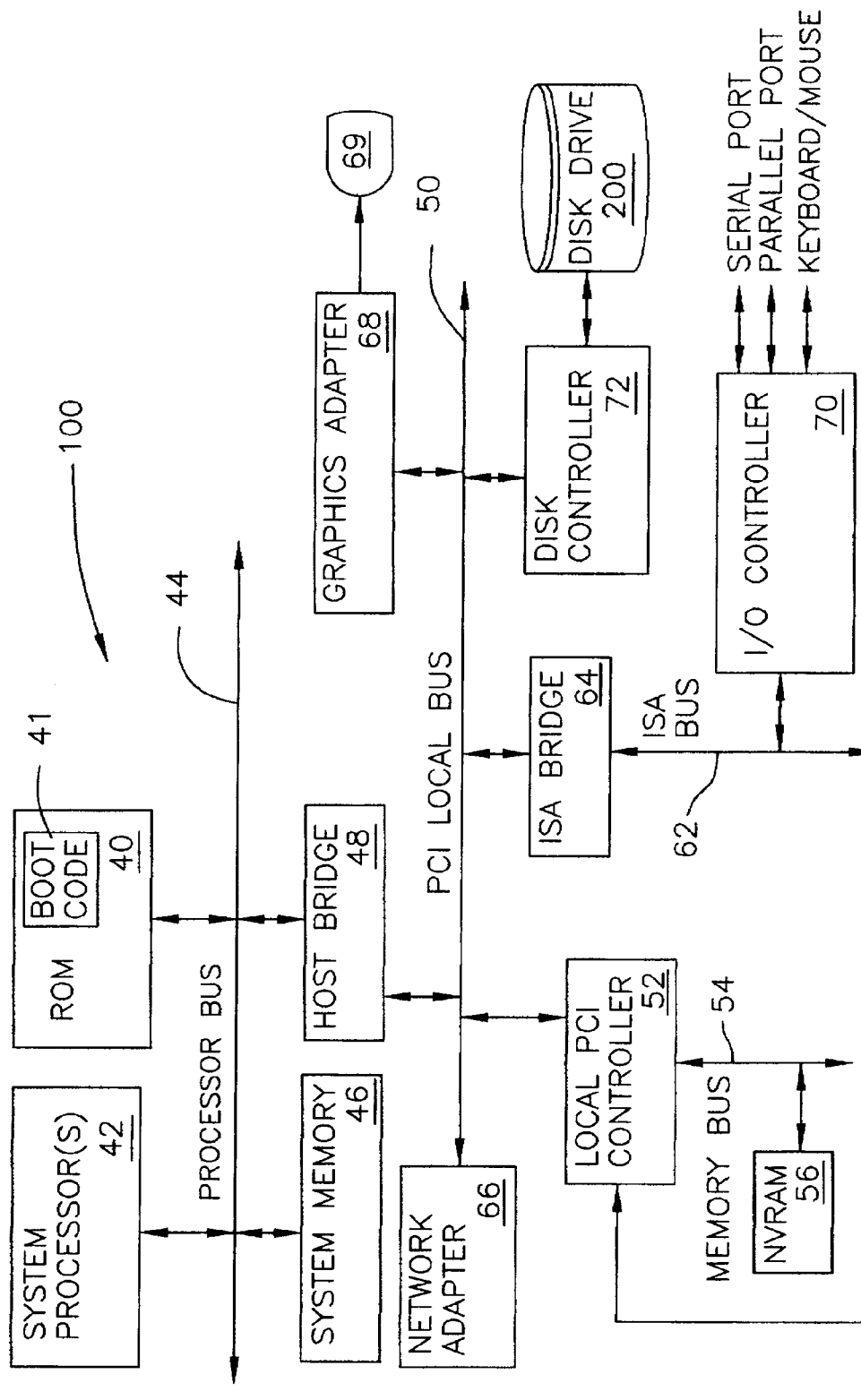
FIG. 1 is a block diagram of a computing device.

While the present invention will be described more fully hereinafter with reference to the accompanying drawings, in which a preferred embodiment of the present invention is shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but does not necessarily, all refer to the same embodiment.

This detailed description will first start with an overview of the instant invention and then provide a more detailed discussion of specific preferred embodiments of the invention with reference to the accompanying drawings. The scope of the invention will be pointed out in the appended claims.

Some helpful background information on enhanced URL sharing may be found in co-pending and commonly assigned U.S. patent application Ser. No. 12/050,813 "Apparatus, System, and Method for Uniform Resource Locator Sharing", filed on Mar. 18, 2008, which is herein incorporated by reference as if fully set forth herein. According to this system, URLs may be shared in order to keep all viewers in a session viewing the same web page. Thus, it allows users to enhance the shared browsing experience by enabling each involved in the session to view the web page.

In collaborative web browsing, URLs are shared between users. When one user navigates to a URL, this new URL is sent to other users in the collaborative session. Their local browsers then navigate to that URL as well. There is a particularly problematic usage case where all users have control and can click links and update everyone else's browsers. This scenario has a problem related to redirects, the automated redirection of a web browser.

For example, if a first user (user 1) goes to a web email site and logs in with his or her credentials (e.g. user name and password), he or she will be directed to an inbox page of the email. This inbox URL will then be sent to another user (user 2) if user 2 is participating in a collaborative web browsing session with user 1. However, since user 2 has not signed into the particular site, when he or she tries to navigate to the inbox, he or she will be redirected back to the sign-in page. This URL that redirects user 2 back to the sign-in page will then be sent to user 1, also part of the collaborative web browsing session. User 1 will often have stored credentials (e.g. a cookie placed on his or her system) and be signed in again. Thus, user 1 will again gain access to the inbox page. Thus, user 2 will again be directed to that page. The loop will then continue in such a fashion. Other loops can also occur. For example, if users in the session click back and forth selecting different pages from a persistent menu.

The present invention provides a solution to web page redirection loops encountered during a collaborative online browsing session. Users of a collaborative web browsing session encounter redirects because of the way web browsing applications work. First, a collaborative web browsing session will be described as contemplated by the instantly claimed invention. Thereafter, specific solutions for redirect loop difficulties encountered during shared or collaborative browsing sessions will be described.

A system for collaborative web-browsing enables users of different peer computers/devices to share a session by passing URLs between the users. A user is provided with an opportunity to utilize a collaborative web-browsing session to discern what others participating in the session are viewing. That is, users may be provided with information about what each of the other users is navigating to in his or her web browser.

Users may open a session specific web browser, a chat window, a list of bookmarks etc., all in one convenient view (e.g. via a plurality of tabs), so as to provide a plurality of users engaged in a collaborative browsing session with one another's navigation data/information. The users participating in the session may pass navigation information/data back and forth between themselves to indicate to one another which links/objects each is viewing.

A collaborative web browsing session enables a first person having a web-browsing session open to navigate on his or her computer (e.g. at home) and a second person having the session open to have a view that is updated contingent upon the first person's activities. Likewise, the second person can navigate independently on his or her machine (e.g. at work) and the first person's view will be updated. The two users' views will update upon the other's received navigation information. The extent of the updating is dependent on the navigation information/data that is exchanged.

An embodiment of the instant invention is directed at providing solutions to problems encountered during collaborative web browsing due to the configuration of the web browsers, particularly when URLs are being passed back and forth between users. This can lead to a scenario wherein users of the collaborative web browsing session can be caught up in a redirection loop.

As an example, when a user signs into email account (or credit card purchase page or the like), typically the user submits a request to the web page and, as a matter of implementation, that that web page understands that the user is sending it certain data (e.g. login or credit card data). After the web page (via its server) processes the login or credit card data, it then sends a response to the user's web browser that directs the browser to go to another page. For email it may be in an inbox whereas for a credit card purchase it may be a redirect to prevent the user from being able to re-click/reload and resubmit credit card information again (i.e. for the same purchase). In essence the user is redirected to a completion page, be it an email inbox or a payment confirmation page.

The above-described scenarios are, however, problematic in certain instances. With URL sharing (as per that which takes place in a collaborative web browsing session) a user might encounter a situation wherein a cycle or loop is produced such that redirects to certain web pages are incompatible with a local user's capabilities.

For example, if one user (user 1) reaches a web page that another user (user 2) cannot reach due to a lack of credentials, user 2 will be redirected to a login page. User 2 may then force user 1 to the login page as well via URL sharing in the collaborative web browsing session.

In the above-described example, when user 1 logs in successfully and directs user 2 to a page requiring credentials, and user 2 does not have the proper credentials (i.e. of the logged-in party), user 2 will fail to login. User 2 is then redirected to the log in page. The session notifies the user 1 of the redirect (via URLs sharing). User 1 will then likewise be redirected to the login page even though he or she just successfully logged in. If user 1 has stored credential for automatic login (e.g. via a cookie stored on the system), user 1 will again login and redirect user 2.

The result is a sort of vicious cycle where one side of the peer-to-peer session is inadvertently poisoning the peer-to-peer session simply because he or she is unable to get past a certain point/web page. The navigation behavior is different on both sides. The instantly claimed invention provides for prevention of such loops by detecting such scenarios and prohibiting redirect commands from having this impact on the collaborative browsing session.

An embodiment of the present invention detects a redirection loop and exits it gracefully. Either the server or the local client machine/device can accomplish this. The server or client device keeps a log/history of the previous web page(s) visited and a count of the number of times a URL is selected.

A client device will recognize that it has gotten a redirect and will not send this particular browsing information on to the other user(s) in the collaborative web browsing session. A server will detect that one user (e.g. via IP address) keeps sending the same URL multiple times in short order (e.g. in a row or within a time threshold that is unreasonable for typical or normal browsing—on the order of seconds). The server will thus detect a loop has been encountered or some other malicious activity has taken place. Time stamps of the IP packets and RTT of the packets containing the URLs to server can be used to determine how frequently the URL is being sent. Rather than always tracking web sites, the server may optionally look for this looping behavior when a certain redirect (e.g. a 301-error redirect message) is detected. This type of redirect increases the chance that a loop will take place.

An embodiment of the instant invention on a client device would include a tracking of the device's behavior and tracking the number of instances that the browser is redirected over a predetermined time (e.g. a threshold time). At least one advantage of a client implementation over a server implementation is that in addition to specific redirects (e.g. 301-error redirect messages indicating that the document has been moved permanently), the client can detect HTML meta tags (located in the head node of a web page document to indicate a redirect upon the elapse of a predetermined time) and other client-type redirects, since the client device is actually loading the web page. If the client device detects a redirect loop, it may need to send a special packet to the server to inform the server of the loop and ask for it to be reconciled.

Once a redirected loop is detected, the server could temporarily ignore URL updates (e.g. for a predetermined time) from all users and direct them back to the last valid/safe (e.g. a pre-loop) page. Alternatively, the collaborative session could break and (in the above example) user1 would be sent to the inbox and user 2 would be sent to the login screen (i.e. the first redirect in the series of redirects for both users). Both users would then be prompted to inform them why their session was broken and may choose to restart the session.

Referring now more particularly to the accompanying drawings, a preferred embodiment of the present invention will be described. The scope of the invention will be pointed out in the appended claims.

Referring now to FIG. 1, there is depicted a block diagram of an illustrative embodiment of a computer system 12. The illustrative embodiment depicted in FIG. 1 may be a notebook computer system, such as one of the ThinkPad® series of personal computers sold by Lenovo (US) Inc. of Purchase, N.Y. or a workstation computer, such as the Intellistation®, which are sold by International Business Machines (IBM) Corporation of Armonk, N.Y.; however, as will become apparent from the following description, the present invention is applicable to operation by any data processing system.

As shown in FIG. 1, computer system 12 includes at least one system processor 42, which is coupled to a Read-Only Memory (ROM) 40 and a system memory 46 by a processor bus 44. System processor 42, which may comprise one of the processors produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to LAN 10, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard, mouse, and a disk drive. In addition, I/O controller 70 supports external communication by computer system 12 via serial and parallel ports.

Figure 2:
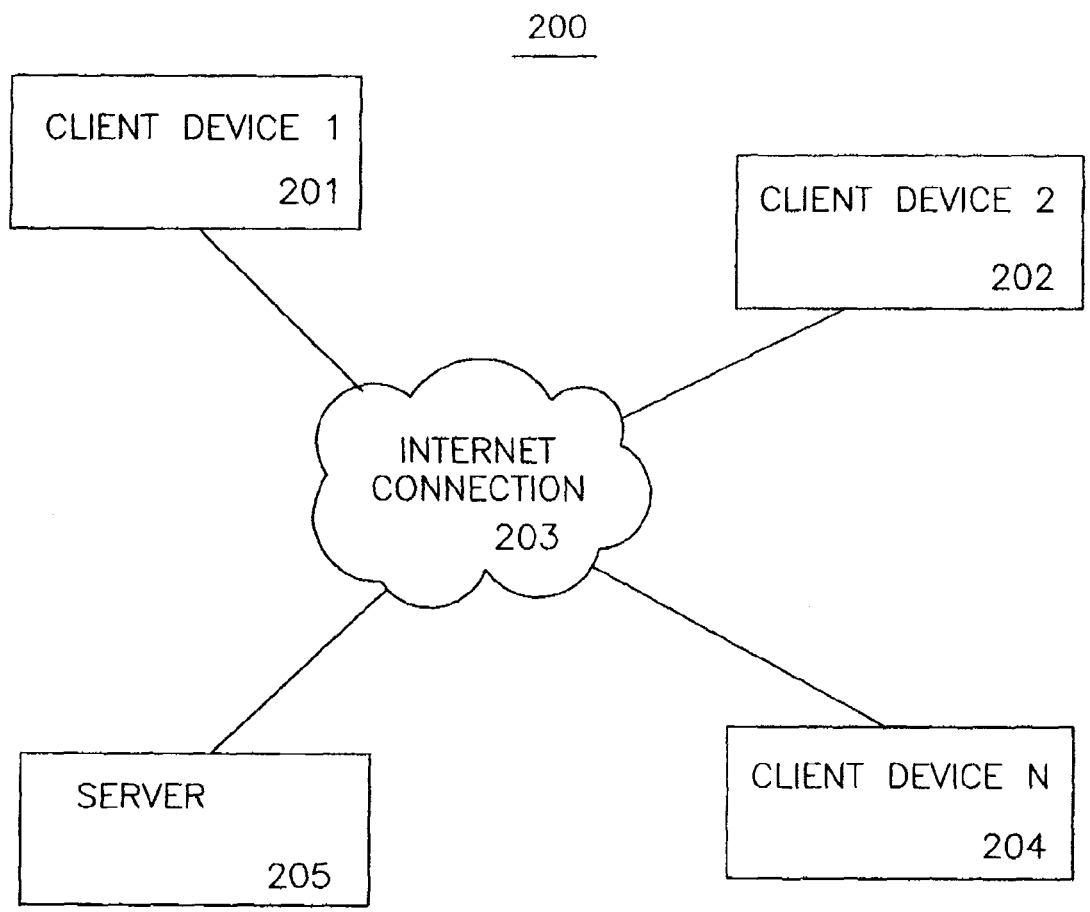
FIG. 2 is a depiction of a collaborative web browsing system.

FIG. 2 shows a shared browsing system (200) in according to one embodiment of the present invention. The system (200) includes a plurality of client devices (e.g. computers) (201, 202, 204) connected a network (e.g. Internet 203) via a plurality of routers (not shown), and a server (205). The network may include a plurality of interconnected computer networks linked through wires/wireless connections. For example, the network may be selected from the Internet, an intranet, a wide area network (WAN), a local area network (LAN), an integrated services digital network (ISDN), or the like. The plurality of computers is in communication with the network.

Each computer (201, 202, 204) and the server (205) may include one or more processor modules and the like referred to herein as modules or components. The server (205) may also include a plurality of databases and a plurality of applications that constitute online web pages (e.g. online store). The server (205) is in communication with the plurality of computers (201, 202, 204) through the network. Each computer (201, 202, 204) may further include a display medium.

Additionally, each computer (201, 202, 204) may include software that includes a web browser. The web browser may be for example MICROSOFT INTERNET EXPLORER®, Mozilla Firefox, Apple Safari, NETSCAPE NAVIGATOR®, or the like. The web browser may automatically convert a plurality of HyperText Markup Language (HTML) codes in the form of corresponding text matter, one or more pictures/drawings, tables, hyperlinks, or the like and display the created web page in an intended format on the screen of the one or more computers (201, 202, 204).

Figure 3:
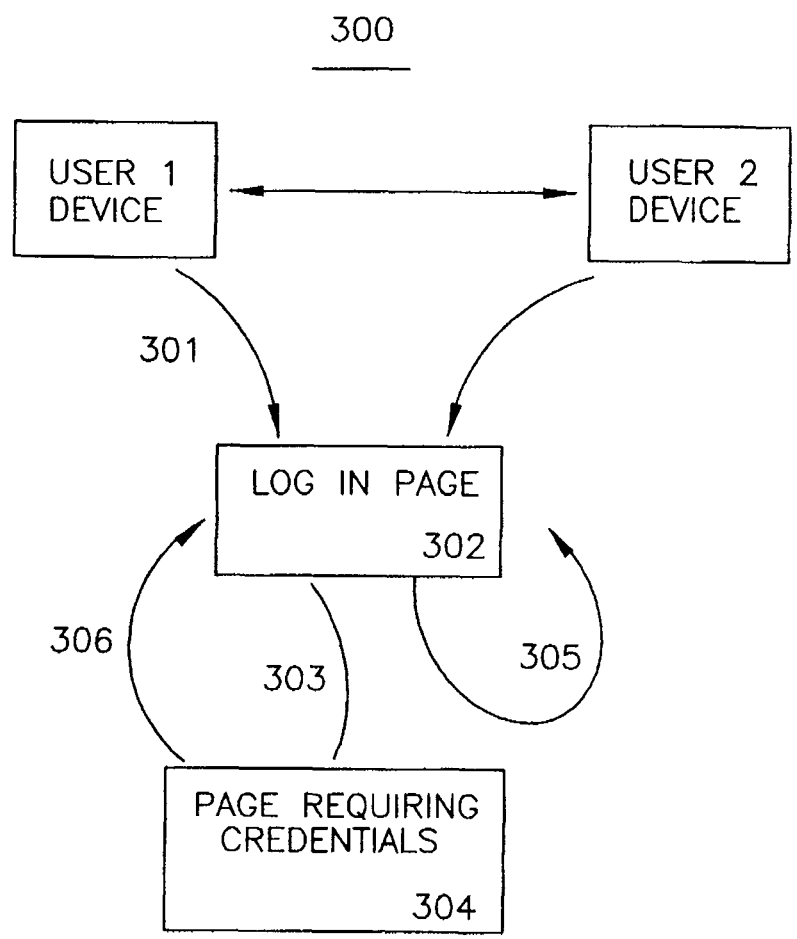
FIG. 3 is a flow chart for a redirection loop.

FIG. 3 shows a flow chart for a redirect loop (300). It should be understood that a redirect is an event that was not initiated or necessarily contemplated by one of the users; it is an event that is performed automatically (e.g. by the web page itself). As a non-limiting example, if user 1 logs into (301) a login page (302) and gains access (303) to a page (304) that requires login credentials (e.g. email inbox of user 2) to view, user 2 may not have the required login credentials. User 1 will direct (305) user 2 to the page (304) via the collaborative web browsing session. Thus, user 1 will gain access (303) to the page (304), while user 2 will be stuck at a login page (301) (redirected to the login). User 2 will then redirect (306) user 1 to the login page (301) via the collaborative web browsing session. User 1 will have stored credentials (e.g. a cookie) such that a login (301) to the login page (302) is again permitted and user 1 again obtains (303) the page (304). Thus, user 1 will again lead (305) user 2 to the page (304) which requires login to view, for which user 2 lacks credentials. The process cycles in such a manner.

Figure 4:
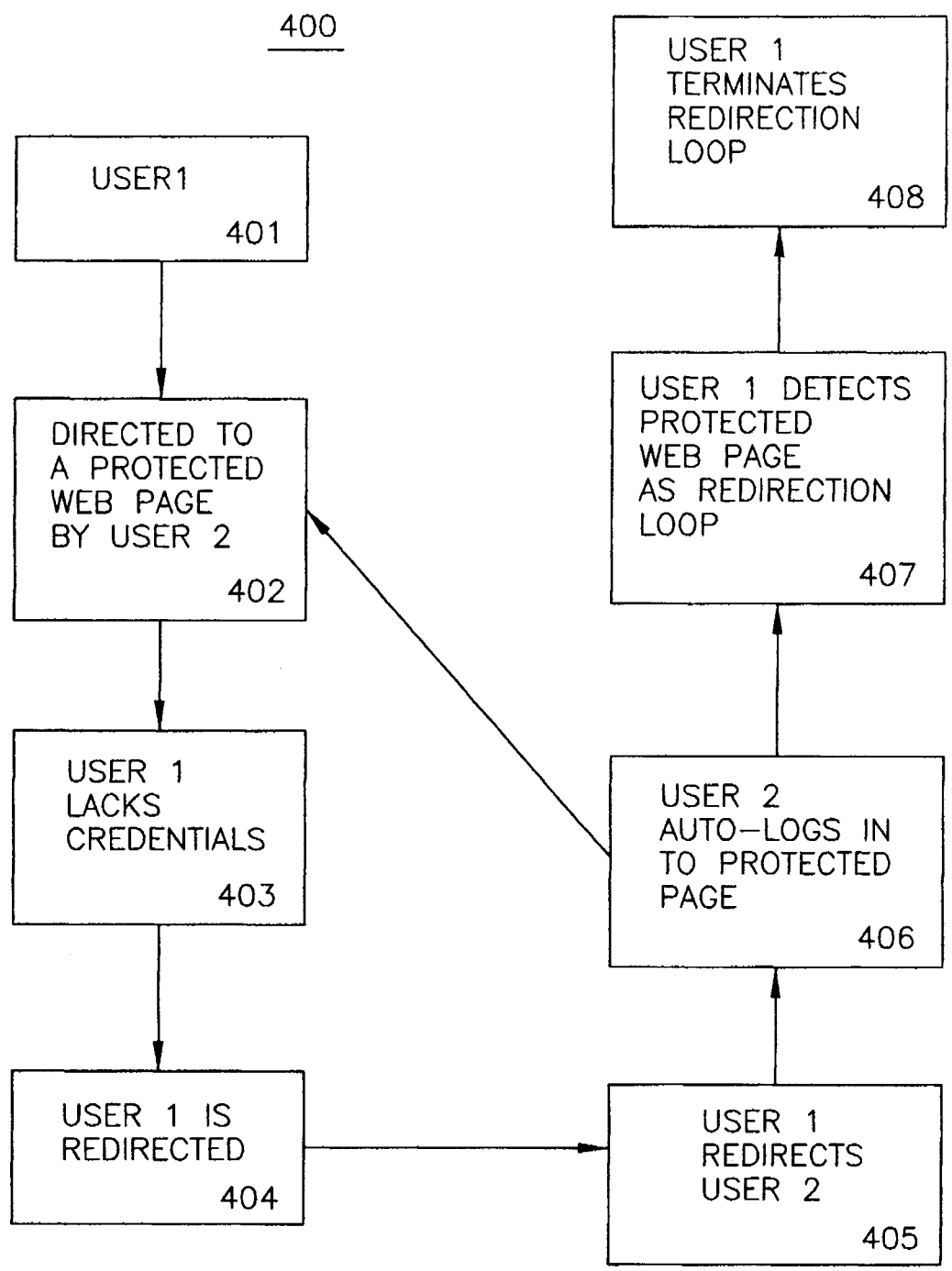
FIG. 4 is a flow chart summarizing the steps for detection and termination of redirection loops.

FIG. 4 is a flow chart depicting detection and termination of redirection loops (400). A user (401) in a collaborative web browsing session is first directed, by another user in the session, to a protected web page (402) (e.g. one requiring login credentials). The user (401) lacks the credentials (403) to gain access through the login page. Therefore, the user (401) is redirected (404) to a login page. User 1 then redirects (405) user 2 to the login page that user 1 (401) has been redirected to. User 2 is able to auto-login (406) by virtue of stored credentials (e.g. cookie stored on user 2 machine). User 2 would then normally direct (402) user 1 (401) to the protected page after gaining access. However, user 1 is enabled to detect the redirection loop (407) (e.g. by consulting a URL history or detecting a direct to the same page within a predetermined amount of time) and terminate the redirection loop (408) (e.g. via exiting the collaborative web browsing session or direction to a valid/safe page).

Figure 5:
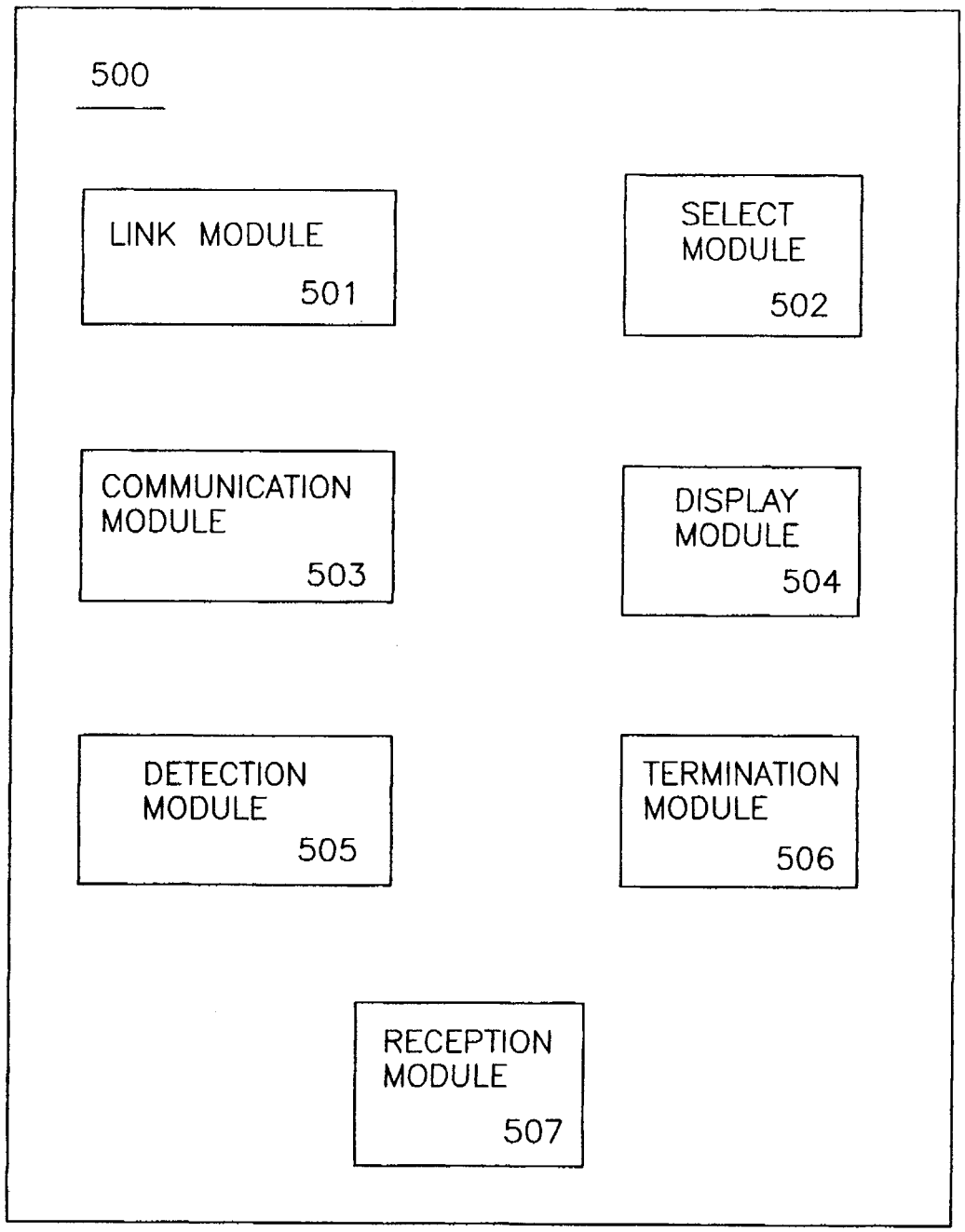
FIG. 5 is a block diagram of an apparatus for detecting and terminating redirection loops.

FIG. 5 is a block diagram of an apparatus (500) for detecting and terminating redirection loops encountered during a collaborative web browsing session. The apparatus (500) may be any suitable device and may be embodied in a computer such as described in FIG. 1. The apparatus (500) contains modules enabling for the joining and participation in a collaborative web browsing session and for detecting redirection loops encountered therein and further for terminating the redirection loops. The apparatus (500) contains a link module (501), a select module (502), a communication module (503), a display module (504), a detecting module (505) and a termination module (506).

The link module (501) links a plurality of users for a collaborative browsing session. A user participating in the session is enabled to select a link displayed by the display module (504) on his or her web browser for sharing using the select module (502). Upon selection, the communication module (504) allows the user to communicate the URL sharing data associated with the selected link to the other users participating in the web browsing session to direct them to the URL. A reception module (507) allows the apparatus to receive other devices' shared URL information. The detection module (505) enables the apparatus (500) to detect a redirect loop (e.g. via consulting a URL history or detecting multiple redirects to a page within a predetermined amount of time). Upon detection of a redirection loop by the detection module (505), the termination module (506) enables the apparatus (500) to terminate the redirection loop (e.g. by terminating the collaborative web browsing session or directing the apparatus (500) to a safe page).

Figure 6:
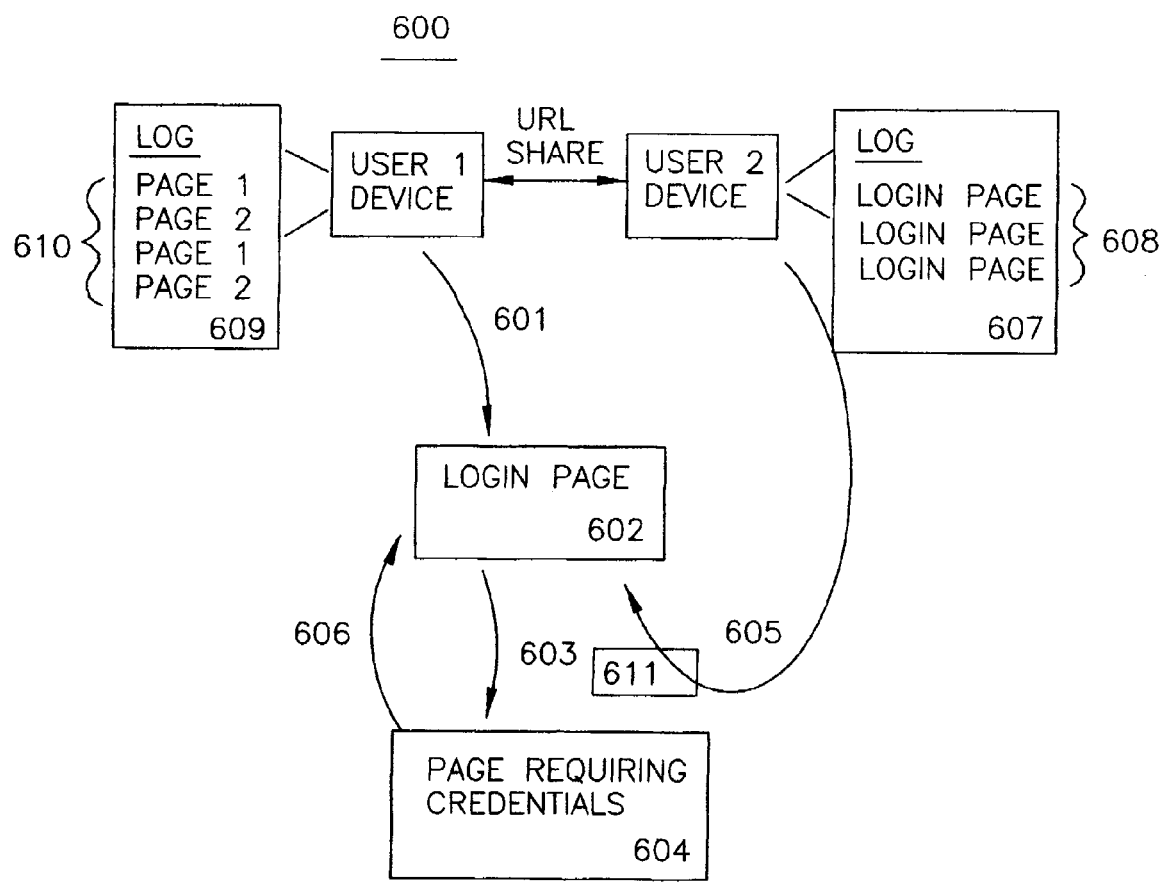
FIG. 6 is a flow chart depicting detection of redirection loops and termination of redirection loops.

FIG. 6 depicts detection of redirect loops (600). Redirect loops may be detected in a number of ways. For example, if user 2 is repeatedly (605) going to the same web page (602) within a short period of time (e.g. on the order of seconds to a minute), a redirect loop may be detected via consulting the history/log (607) of URL navigation (that is stored and relied upon to detect a redirect loop). Repeated URL entries in the history (608) may indicate that they were generated by a redirect loop taking place in the collaborative web browsing session. Alternatively, a particular pattern (610) stored in a user history (609) may indicate that a redirect loop has been encountered. Still further, receipt (612) of a particular redirect message (611) (e.g. from a server) may be utilized (e.g. 601 redirect message) to detect a redirect loop.

An embodiment of the instant invention is capable of sending additional data/information regarding the redirect via the communication module (503). For example, the present invention is able to discern and communicate which user originated the action/click that started the redirect loop by utilizing user information (e.g. IP address). This may be advantageous for preventing additional encounters with redirects during the collaborative browsing session. Some examples of other additional data/information that may be included in communications sent between the users of the collaborative web browsing session are user names and the general URL history that is captured and stored on client devices. Thus user(s) are enabled to view the browsing history (e.g. users joining the session). Essentially any additional data that is helpful may be passed along; however, additional data should not impact performance due to excess data being passed. Thus, most types of text information can be passed back and forth or any type of user browser activity information can be passed back and forth.

An embodiment of the present invention may be provided as a computer program product which may include a machine-readable medium having stored thereon instructions which may be used to program a computer (or other electronic devices) to perform a process according to the any of the embodiments of the present invention. The machine-readable medium may include, but is not limited to, floppy diskettes, optical disks, CD-ROMs, and magneto-optical disks, ROMs, RAMs, EPROMs, EEPROMs, magnet or optical cards, or other type of media/machine-readable medium suitable for storing electronic instructions. Moreover, an embodiment of the present invention may also be downloaded as a computer program product, wherein the program may be transferred from a remote computer to a requesting computer by way of data signals embodied in a carrier wave or other propagation medium via a communication link (e.g., a modem or network connection).

Elements of the instant invention may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

In the drawings and specification there has been set forth a preferred embodiment of the invention and, although specific terms are used, the description thus given uses terminology in a generic and descriptive sense only and not for purposes of limitation.

If not otherwise stated herein, it is to be assumed that all patents, patent applications, patent publications and other publications (including web-based publications) mentioned and cited herein are hereby fully incorporated by reference herein as if set forth in their entirety.

Many of the functional units described in this specification have been labeled as modules in order to emphasize their implementation independence. Modules may include hardware circuits such as one or more processors with memory, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

What is claimed is:

1. A system comprising:
   a CPU;
   a memory in communication with the CPU;
   instructions stored in the memory and executable by the CPU to prevent redirects encountered during a collaborative web browsing session, the instructions further comprising:
   instructions enabling a device to join a collaborative web browsing session;
   instructions enabling detection of a redirection loop, wherein the instructions enabling detection of a redirection loop further comprise instructions enabling detection of a redirection loop based upon a query to a URL history stored in a memory; and
   instructions enabling termination of the redirect loop, wherein the instructions enabling termination of the redirect loop further comprise instructions prohibiting sending redirect information to at least one other user device in the collaborative web browsing session upon recognizing the device has entered a redirection loop.

2. The system according to claim 1 wherein the instructions enabling detection of a redirection loop based upon a query to a URL history stored in the memory further comprise:
   instructions enabling detection of a redirection pattern in the URL history.

3. The system according to claim 1 further comprising:
   instructions enabling termination of the redirect loop via terminating the collaborative web browsing session.

4. The system according to claim 3 further comprising:
   instructions enabling at least one other device participating in the shared web browsing session to be informed of the termination.

5. The system according to claim 1 further comprising:
   instructions enabling detection that the device has repeatedly sent a URL within a predetermined amount of time.

6. The system according to claim 1 wherein upon detection of a redirect loop, the system directs the device to a safe page to terminate the redirection loop.

7. The system according to claim 1 wherein, upon the detection of a redirection loop, the device ignores URL updates of the collaborative web browsing session for a predetermined amount of time.

8. A method comprising:
   enabling a device to join a collaborative web browsing session;
   detecting a redirection loop, wherein the detecting further comprises detecting a redirection loop based upon a query to a URL history stored in a memory; and
terminating the redirect loop,
wherein the terminating further comprises prohibiting sending redirect information to at least one other user device in the collaborative web browsing session upon recognizing the device has entered a redirection loop.

9. The method according to claim 8 wherein detecting based upon a query to a URL history stored in the memory further comprises:
detecting a redirection pattern in the URL history.

10. The method according to claim 8 wherein the terminating further comprises terminating the collaborative web browsing session.

11. The method according to claim 10 further comprising:
enabling at least one other device participating in the shared web browsing session to be informed of the termination.

12. The method according to claim 8 further comprising:
detecting that the device has repeatedly sent a URL within a predetermined amount of time.

13. The method according to claim 8 wherein upon detection of a redirect loop, the system directs the device to a safe page to terminate the redirection loop.

14. The method according to claim 8 wherein, upon the detecting of a redirection loop, the device ignores URL updates of the collaborative web browsing session for a predetermined amount of time.

15. The method of claim 8, wherein a redirect loop comprises a cycled peer-to-peer collaborative web browsing session resulting form redirects involving a log-in page for which at least one participant in the collaborative web browsing session does not have appropriate log-in credentials.

16. A non-transitory program storage device readable by machine,
tangibly embodying a program of instructions executable by the machine to perform a method comprising:
enabling a device to join a collaborative web browsing session;
detecting a redirection loop,
wherein the detecting further comprises detecting a redirection loop based upon a query to a URL history stored in a memory; and
terminating the redirect loop,
wherein the terminating further comprises prohibiting sending redirect information to at least one other user device in the collaborative web browsing session upon recognizing the device has entered a redirection loop.

* * * * *